2,750,430

PRODUCTION OF SYNTHETIC ALIPHATIC ALCOHOLS

August Hagemann, Duisburg-Meiderich, and Karl Büchner, Duisburg-Hamborn, Germany, assignors to Ruhrchemie Aktiengesellschaft, Oberhausen-Holten, and Lurgi Gesellschaft für Warmetechnik, Frankfurt am Main, Heddernheim, both corporations of Germany No Drawing. Application January 17, 1951,
Serial No. 206,514

Claims priority, application Germany February 3, 1950

7 Claims. (Cl. 260—638)

This invention relates to improvements in the production of synthetic aliphatic alcohols.

Aliphatic alcohols, and particularly those of higher molecular weight, are valuable starting products for numerous branches of the organic chemicals industry, wherein they are used, for example, for the manufacture of solvents, softeners, plastics, detergents and pharmaceutical products. In catalytic carbon monoxide hydrogenation, such alcohols are produced under given conditions in continuous sequence from the lowest molecular size to the highest. With the use of special iron catalysts, the yield of oxygen-containing products can be so increased, if suitable synthesis conditions are employed, that about 50% alcohols are contained in the primary products of the carbon monoxide hydrogenation. In addition to these, there are also aldehydes, ketones, esters and similar oxygen compounds produced. At the same time, certain quantities of hydrocarbons and particularly olefines are produced. The separation and purification of the aliphatic alcohols produced in this manner is made very difficult by the large number of other organic compounds. Furthermore, the alcohols which are isolated from the reaction products always have a more or less pronounced unpleasant odor, due to which their further working into different finished products is made very complicated and, in part, even completely impossible.

One object of this invention is to overcome all the aforementioned difficulties. This and further objects will become apparent from the following description and examples.

It has now been found that these difficulties can be reduced and that a high yield of synthetic alcohols can be obtained if the alcohol synthesis is carried out in the three following steps: first of all, gas mixtures containing carbon monoxide and hydrogen are converted with iron catalysts into products containing more than 50% oxygen-containing compounds, and predominantly alcohols, in addition to unsaturated hydrocarbons; then, carbon monoxide and hydrogen are added under increased pressure, preferably above 40 atmospheres, at 120 to 220° C. to the olefine hydrocarbons in the presence of the oxygen-containing synthesis products, by the use of cobalt compounds and preferably aqueous solutions of cobalt salts; finally, the reaction products thereby produced are catalytically reduced with hydrogen.

The three steps constituting the method according to the present invention can each be carried out in several stages. The catalytic carbon monoxide hydrogenation used as initial reaction can, for example, take place in two to three synthesis stages in a closed circuit. From the products of the individual synthesis stages, the gaseous compounds formed under normal conditions, and the carbon dioxide formed, are removed as far as possible before commencing operations on the remaining gases in the next stage. The absorption of the gaseous compounds is effected, for example, by an oil scouring, while the carbon dioxide can be removed by a scouring with water under pressure.

It has now been found that the catalytic addition of carbon monoxide and hydrogen to olefine hydrocarbons can be carried out with the use of aqueous solutions of cobalt salts as catalyst without any difficulty and without any disturbance even in the case of olefine mixtures which contain oxygen compounds. Heretofore, this could only be effected industrially with olefine mixtures from which all oxygen-containing compounds had been removed to the greatest extent possible. The cobalt salt solution which serves as catalyst is acidified to a pH of 1 to 6 by means of organic or inorganic acids. Furthermore, the presence of the organic monocarboxylic acids in the reaction products of the first step of the method is extremely desirable while it causes great difficulties in the working up of the primary products of the carbon monoxide hydrogenation in almost all other cases.

It is advantageous to first of all separate the aqueous portions from the products of the catalytic carbon monoxide hydrogenation which are to be worked, as they would strongly dilute the cobalt catalysts, and particularly the cobalt salt solutions, used in the second step of the process, i. e. in the addition of carbon monoxide and hydrogen. From these aqueous products, the carbon compounds present, consisting extensively of alcohols and other oxygen-containing compounds, can be separated by distillation in order to subject them, along with the non-aqueous remaining carbon monoxide hydrogenation products, to the catalytic water-gas addition, i. e. the second step of the process. At the same stage of the process, the hydrocarbons which were removed from the carbon monoxide hydrogenation products by oil scouring can also be added.

The reduction of the reaction products produced in the second step of the process by catalystic addition of carbon monoxide and hydrogen is preferably carried out in two stages. In the first reaction stage, the aldehydes, ketones, hydroxy-aldehydes and similar oxygen compounds present are reduced to alcohols. In this connection, it is preferable to operate with firmly attached reduced cobalt catalysts on which the small quantities of the cobalt which was dissolved in the second step of the process during the catalytic water-gas addition will precipitate as a metal. The operating temperature for the first reduction stage is 180 to 200° C.

The second reduction stage must convert the esters present in the reaction mixture into alcohols. For this purpose, oxide catalysts are used, for example, copper-chrome catalysts at temperatures of 200 to 250° C., with a hydrogen pressure of 150 to 250 kgs./cm.$^2$. If these reduction conditions are maintained, only the undesired esters are converted into alcohols and the alcohols present are not changed. The olefine-containing reaction mixture formed in the first operation upon the addition of CO and $H_2$ contains predominantly aldehydes and alcohols. In addition, however, there are also smaller or larger amounts of oxygen-containing compounds having an ether-like bond. By the already described catalytic addition of hydrogen these mixtures can be converted into final products which consist predominantly of alcohols of the most varied molecular sizes. In the past the ether-like products could frequently not be completely utilized for the formation of alcohol in this type of reduction with hydrogen. There the greatest part consists of acetals which are formed from aldehydes and alcohols present in the mixture or produced during the reaction. Their formation leads to a considerable reduction of the theoretically possible alcohol yield. If now, the hydrogenation of the reaction products obtained from the carbon monoxide hydrogenation products by catalytic addition of CO and $H_2$ is not carried out with hydrogen alone, but rather is carried out with hydration, i. e. in the presence of sufficient quantities of water, the alcohol yield can be increased. In this connection, the aldehyde primarily produced, in addition to the alcohol, by the splitting up of acetal is reduced by hydrogen to alcohol so that there is obtained the alcohol of the aldehyde components as well as the alcohol of the alcohol components.

The hydrating hydrogenation which is particularly suitable for the carrying out of the process, is preferably carried out with nickel-containing catalysts. Catalysts consisting of nickel and magnesium oxide and containing kieselguhr as carrier, have a very favorable action. By a short hydrogen treatment with the use of these catalysts at approximately 160 to 180° C., the acetals present in the reaction product are split and the liberated aldehydes are hydrogenated into alcohols.

In the final hydrating hydrogenation of the carbon monoxide hydrogenation products converted with CO and $H_2$, there must be present a quantity of water which exceeds as far as possible the quantity of water to be taken up by the ether bonds which are to be split open. This quantity of water is added prior to the hydrogenation but it also may be supplied in part by an aqueous catalyst solution which is used in the high pressure water-gas addition and the water content of which is taken up to a slight extent in the products of the carbon monoxide and hydrogen addition.

After the reduction of the reaction mixture obtained in the second step of the process, i. e. after the termination of the third step of the process, a mixture is obtained which consists almost entirely of aliphatic alcohols and saturated hydrocarbons. The aliphatic alcohols can be removed therefrom without any technical difficulties in a state of high purity, completely free of any foreign odor. For this purpose, various methods known per se can be used as for example, azeotropic distillation; esterification, as with the use of boric acid; or fractional adsorption, as with active kieselguhr or with aluminum oxide. Selective extraction has proven particularly advantageous for this purpose.

If the alcohol-hydrocarbon mixture is worked up by distillation, it is frequently advisable to cut off the products boiling above 340° C. and convert them by complete hydrogenation entirely into paraffin hydrocarbons. From these hydrogenation products, commercial types of paraffin, for example, paraffin slabs or hard paraffin of a high melting point, can be obtained by extraction, distillation or sweating. Instead of this, however, the portions boiling above 340° C. may be converted without prior hydrogenation into valuable special waxes by oxidation, for example, with nitrous gases or by alkali fusion.

The following examples are given by way of illustration and not limitation.

Example 1

With iron catalysts which preferably form oxygen-containing synthesis products, a water-gas containing 40 parts by volume of carbon monoxide and 50 parts by volume of hydrogen, in addition to 10 parts by volume of inert gas, was converted at 198° C., and a pressure of 30 kgms. per sq. cm. The gas charge was in this connection 100 parts by volume of gas per part by volume of catalyst per hour, a cycling ratio of approximately one part by volume fresh gas to two parts by volume recycled gas being used in a two-stage operation. In each stage there was obtained a conversion of approximately 60% $CO+H_2$ which corresponded to a total conversion of 84% $CO+H_2$. After the first synthesis stage, the gaseous hydrocarbons were removed by an oil scouring, and furthermore the carboxylic acids present in the remaining gases were washed out down to about 10 volumetric per cent $CO_2$ of the original quantity present.

The aqueous phase was separated from the liquid products produced in both stages by passing through a settling receptacle. The non-aqueous product contained about 60% oxygen-containing compounds. With this there were combined the products distilled off from the oil and which contained, in addition to predominantly $C_3$ and $C_4$ olefine hydrocarbons, also oxygen-containing compounds. Furthermore, the hydrocarbon compounds separated from the aqueous synthesis phase by distillation were added. Thereupon, the mixture had the following properties.

| | |
|---|---|
| Iodine number | 38 |
| Neutralization number | 20 |
| Ester number | 25 |
| Hydroxyl number | 153 |
| Carbonyl number | 27 |

The initial boiling point of this product was 56° C. Up to 320° C. 90% distilled over.

5000 cc. of the mixture obtained in this manner were stirred with 500 cc. of a cobalt sulphate solution which contained 350 grams cobalt sulphate heptahydrate per liter. The mixture was thereupon poured into a reaction vessel having a useful capacity of 10,000 cc. and consisting of chrome-nickel steel. With continuous stirring, the temperature was brought to 140° C. and a gas mixture consisting of 40 parts by volume of CO in addition to 50 parts by volume of $H_2$ and 10% inert gases was contacted with it at a pressure of up to 190 kgms. per sq. cm. After treatment for 50 minutes, the absorption of the gas was concluded. Thereupon, the catalyst solution was separated as the lower layer and 100 grams of a reduced cobalt catalyst were added. Thereupon, the reaction mixture was treated with hydrogen at 180 to 190° C. and 150 kgms. per sq. cm. until there was no longer any absorption of gas. After a time of reaction of approximately 20 minutes, it was separated from the catalyst. The reaction mixture then had the following characteristics:

| | |
|---|---|
| Iodine number | 0 |
| Hydroxyl number | 235 |
| Carbonyl number | 5 |
| Ester number | 31 |

This product was treated in a second hydrogenation stage of 250° C. and a pressure of 200 to 250 kgms. per sq. cm. with an oxide copper-chrome catalyst once more with hydrogen. In this connection, the ester number dropped to practically zero, while the acid number decreased to less than 1. The hydroxyl number experienced a further increase by 60 units, inasmuch as the ester still present in the reaction mixture was completely converted into alcohol by the second hydrogen treatment.

The reaction mixture remaining after the second hydrogenation stage was separated by distillation from the constituents boiling above 380° C. The product boiling below 380° C. contained approximately 85% aliphatic alcohols.

Upon suitable fractionation of the reaction mixture, it was found that the fraction boiling between 30 and 110° C. contained approximately 90% alcohols, the fraction boiling between 110 and 220° C. contained 95% aliphatic alcohols, the product boiling between 220 and 320° C. contained 85 to 90% alcohols, and the product boiling between 320 and 380° C. contained 60 to 65% aliphatic alcohols.

Example 2

By catalytic water-gas conversion with iron catalysts there were obtained in a two-stage process, with carbon dioxide scrubbers and oil scouring inserted in the customary manner between the stages, carbon monoxide hydrogenation products from which there was cut, with the elimination of the gaseous hydrocarbons (gas oils), aqueous products and paraffine fraction, a fraction boiling between 50 and 360° C. This fraction had the following characteristics:

| | |
|---|---|
| Density | 0.779 |
| Index of refraction $n_{D/20}$ | 1.4178 |
| Hydroxyl number | 212 |
| Neutralization number | 0.2 |
| Ester number | 12.3 |
| Carbonyl number | 21 |
| Iodine number | 50 |

4800 cc. of this fraction were mixed with 1500 cc. of a solution which contained 13.6 grams Co in the form of $CoSO_4$ and 21 grams MgO in the form of $MgSO_4$ per liter at a hydrogen ion concentration (pH) of 5.8. The mixture was treated for 90 minutes at a pressure of 117 to 188 kgms. per sq. cm. and a temperature of 150 to 160° C. with water-gas which contained 41 volumetric percent carbon monoxide and 51 volumetric percent hydrogen, in addition to 8 volumetric percent inert gases. There were obtained 4750 cc. of a formylation product which had the following characteristics:

| | |
|---|---|
| Density | 0.812 |
| Index of refraction $n_{D/20}$ | 1.4299 |
| Hydroxyl number | 101 |
| Carbonyl number | 51 |
| Neutralization number | 0.8 |
| Ester number | 14.8 |
| Iodine number | 2 |

The above values show that obviously approximately 50% of the carbonyl number cannot be analytically determined, inasmuch as in view of the decrease in the iodine number from a value of 50 prior to the treatment with the $Co+H_2$ mixture to a value of 2 after this treatment, also known as "oxolation," i. e. by about 48 units, the carbonyl number should have risen to about twice its value, i. e. to approximately 102. From this it can be noted that ether-like compounds may have formed in part from the aldehydes and alcohols produced.

In order to liberate these quantities of alcohol, the products obtained in the catalytic addition of water-gas (oxolation) were mixed with 400 cc. water, whereupon 150 grams of a catalyst were added which contained 12 parts magnesium oxide and 60 parts kieselguhr per hundred parts metallic nickel. The reaction mixture was then treated for 60 minutes at 150 kgms. per sq. cm and 160° with hydrogen. There was obtained a final product having the following characteristics:

| | |
|---|---|
| Density | 0.808 |
| Index of refraction $n_{D/20}$ | 1.4229 |
| Hydroxyl number | 317 |
| Carbonyl number | 2 |
| Neutralization number | 1 |
| Ester number | 15 |
| Iodine number | 0 |

When the hydrogenation was carried out without sufficient addition of water, a hydroxyl number of only 296 could be obtained. From the difference between the hydroxyl numbers of 317 and 296, it results that an increased yield of at least 6% alcohols was produced by using hydrating hydrogenation.

We claim:
1. In the method for obtaining alcohols from catalytic carbon monoxide-hydrogen synthesis products containing olefins and more than 50% oxygen-containing organic compounds including alcohols in which the synthesis products are contacted with a carbon monoxide-hydrogen containing gas under the conditions of the oxosynthesis and the reaction product thereafter hydrogenated, the improvement which comprises effecting the contacting of such synthesis products with carbon monoxide and hydrogen in the presence of an aqueous cobalt salt solution having a pH of about 1-6 at increased pressure and a temperature of 120-220° C. to thereby convert the olefins contained therein to oxygenated organic compounds, thereafter catalytically reducing these products with hydrogen, and recovering an increased yield of aliphatic alcohols.

2. Improvement according to claim 1 in which said synthesis products containing more than 50% oxygen-containing compounds are the total non aqueous liquid synthesis products from the catalytic carbon monoxide hydrogenation.

3. Improvement according to claim 1 in which said catalytic reduction with hydrogen is effected in the presence of water.

4. Improvement according to claim 3 in which said catalytic reduction with hydrogen is effected with a nickel catalyst containing magnesium oxide.

5. Improvement according to claim 3 in which the catalytic reduction with hydrogen is effected with a nickel catalyst containing kieselguhr.

6. Improvement according to claim 1 in which said aliphatic alcohols are recovered by extraction and thereafter separated by fractionation.

7. Improvement according to claim 1, which includes, prior to said recovery of aliphatic alcohols, separating a fraction having a boiling point exceeding 340° C. from the reaction product obtained from said contacting with carbon monoxide and hydrogen and said subsequent catalytic reduction with hydrogen, and converting such a fraction by hydrogenation into high molecular paraffin hydrocarbons.

References Cited in the file of this patent
UNITED STATES PATENTS

| | | |
|---|---|---|
| 2,149,515 | Fischer | Mar. 7, 1939 |
| 2,449,470 | Gresham et al. | Sept. 14, 1948 |
| 2,549,111 | Millendorf et al. | Apr. 17, 1951 |
| 2,560,360 | Mertzweiller et al. | July 10, 1951 |
| 2,567,980 | Atwell | Aug. 7, 1951 |
| 2,609,382 | Mayland | Sept. 2, 1952 |

FOREIGN PATENTS

| | | |
|---|---|---|
| 147,118 | Great Britain | Nov. 7, 1921 |

OTHER REFERENCES

Chem. and Met. Eng. (January 1946), vol. 53, pp. 220, 222 and 224.

German patent application, I 67,906 IVd/120, T. O. M. Reel 36, Item 21 and part of Item 36, O. Z. 12,360. Deposited in Library of Congress on March 12, 1946. Also available in the Meyer translation, pp. 17 to 19.